(12) United States Patent
Kwak (10) Patent No.: US 9,857,012 B2
(45) Date of Patent: Jan. 2, 2018

(54) APPARATUS OF CONTROLLING ELECTRIC POWER FOR ELECTRIC FUSION PIPE FITTING USING CONDUCTIVE POLYMER COMPOSITE AND METHOD THEREOF

(71) Applicant: Georg Fischer Piping Systems Ltd., Schaffhausen (CH)

(72) Inventor: You Shik Kwak, Busan (KR)

(73) Assignee: Georg Fischer Piping Systems Ltd. (CH)

( * ) Notice: Subject to any disclaimer, the term of this patent is extended or adjusted under 35 U.S.C. 154(b) by 318 days.

(21) Appl. No.: 14/434,267

(22) PCT Filed: Oct. 14, 2013

(86) PCT No.: PCT/KR2013/009137
§ 371 (c)(1),
(2) Date: Apr. 8, 2015

(87) PCT Pub. No.: WO2014/061945
PCT Pub. Date: Apr. 24, 2014

(65) Prior Publication Data
US 2015/0267852 A1    Sep. 24, 2015

(30) Foreign Application Priority Data

Oct. 18, 2012 (KR) .................. 10-2012-0116075

(51) Int. Cl.
*F16L 47/03* (2006.01)
*F16L 47/00* (2006.01)
(Continued)

(52) U.S. Cl.
CPC .......... *F16L 47/00* (2013.01); *B29C 65/3412* (2013.01); *B29C 65/3468* (2013.01);
(Continued)

(58) Field of Classification Search
CPC .. F16L 47/03; B29C 65/3488; B29C 65/3492; B29C 66/91214;
(Continued)

(56) References Cited

U.S. PATENT DOCUMENTS 4,602,148 A    7/1986  Ramsey
4,978,837 A *  12/1990 Eggleston ............. B29C 65/342
                                                       219/497

(Continued)

FOREIGN PATENT DOCUMENTS

JP         H09-273691 A     10/1997
KR    10-2010-0004835 A      1/2010
(Continued)

OTHER PUBLICATIONS

International Search Report (in English and Korean) for PCT/KR2013/009137, dated Jan. 22, 2014; ISA/KR.

*Primary Examiner* — Carson Gross
(74) *Attorney, Agent, or Firm* — Harness, Dickey & Pierce, P.L.C.

(57) ABSTRACT

Provided is an electric power control apparatus of an electrofusion coupling pipe using a conductive polymer composite as a heating element and a method of controlling electric power using the same. The electric power control apparatus supplies electric power to the electrofusion coupling pipe using a conductive polymer composite as a heating element to detect resistance variation of the conductive polymer composite and then controls electric power supplied to the synthetic resin pipe electrofusion coupling pipe on the basis of the detected resistance variation.

12 Claims, 8 Drawing Sheets

(51) Int. Cl.
*H05B 3/44* (2006.01)
*H05B 1/02* (2006.01)
*H05B 3/14* (2006.01)
*B29C 65/00* (2006.01)
*B29C 65/34* (2006.01)
*B29C 65/56* (2006.01)
*B29C 65/72* (2006.01)
*H05B 1/00* (2006.01)
*B29K 507/04* (2006.01)
*B29C 65/36* (2006.01)

(52) U.S. Cl.
CPC ...... *B29C 65/3488* (2013.01); *B29C 65/3492* (2013.01); *B29C 65/3496* (2013.01); *B29C 65/561* (2013.01); *B29C 65/72* (2013.01); *B29C 66/1248* (2013.01); *B29C 66/12441* (2013.01); *B29C 66/5221* (2013.01); *B29C 66/9192* (2013.01); *B29C 66/91214* (2013.01); *B29C 66/91221* (2013.01); *B29C 66/91317* (2013.01); *B29C 66/91411* (2013.01); *B29C 66/91651* (2013.01); *B29C 66/91921* (2013.01); *B29C 66/961* (2013.01); *F16L 47/03* (2013.01); *H05B 1/00* (2013.01); *H05B 1/0283* (2013.01); *H05B 3/146* (2013.01); *H05B 3/44* (2013.01); *B29C 65/3612* (2013.01); *B29C 65/3684* (2013.01); *B29C 65/3696* (2013.01); *B29C 66/52291* (2013.01); *B29C 66/71* (2013.01); *B29C 66/735* (2013.01); *B29C 66/91643* (2013.01); *B29C 66/91653* (2013.01); *B29C 66/91655* (2013.01); *B29C 66/91951* (2013.01); *B29K 2507/04* (2013.01)

(58) Field of Classification Search
CPC ........ B29C 66/91317; B29C 66/91653; B29C 66/91655; B29C 66/96; B29C 66/961
See application file for complete search history.

(56) References Cited

U.S. PATENT DOCUMENTS

| | | | |
|---|---|---|---|
| 6,680,464 B1* | 1/2004 | Carter, Jr. | F16L 47/03 156/274.2 |
| 2006/0016552 A1* | 1/2006 | Barbone | B29C 45/14 156/272.2 |

FOREIGN PATENT DOCUMENTS

| WO | WO-2007-091799 A1 | 8/2007 |
|---|---|---|
| WO | WO-2010-002204 A2 | 1/2010 |

* cited by examiner

APPARATUS OF CONTROLLING ELECTRIC POWER FOR ELECTRIC FUSION PIPE FITTING USING CONDUCTIVE POLYMER COMPOSITE AND METHOD THEREOF

TECHNICAL FIELD

The present invention relates to an apparatus for controlling electric power supplied to an electrofusion coupling pipe connecting thermoplastic synthetic resin pipes which are used for various usages such as a gas pipe, a water pipe, and a heating pipe and a method of controlling electric power using the same. More specifically, the present invention relates to an electric power control apparatus of an electrofusion coupling pipe using a conductive polymer composite as a heating element and a method of controlling electric power using the same.

BACKGROUND ART

In connecting conventional thermoplastic resin pipes made of polyethylene (PE) and polypropylene (PP) used for a gas pipe, a water pipe or other purposes, thermal fusion methods has widely been used to obtain perfect air tightness.

Conventional thermal fusion methods include butt fusion welding, heat fusion socket welding, and electrofusion socket welding or electric fusion.

Among these methods, electrofusion socket welding (hereinafter referred to as 'electrofusion') provides excellent fusion quality and thus is used for a pipe such as a gas pipe where air-tightness is required. Electrofusion employs an integrated type of socket prepared by injection molding performed by inserting a heat element such as a heating coil into an inside of a coupling socket. A heating coil employs a metal wire having an electric resistance which is maintained to some extent, such as a copper wire, a copper alloy wire or a nichrome wire. For example, an resistive wire or spiral shaped resistive wire coated with a thermoplastic resin is wound to have a coil shape and an electric terminal is connected at the end of the coil. Then, an electric resistance wire-integrated coupling socket is prepared by inserting the resulting product into an injection mold via injection molding.

Generally, a material which is the same with a material of a pipe is used as a material for an electrofusion coupling pipe. For example, the material used for a coupling pipe used for connecting a PP pipe is PP.

An electrofusion socket prepared in this manner is fit to a pipe to be fused and then electric power supplies to the electrofusion socket for a certain period of time. As a result, the pipe is connected to the electrofusion socket as the external diameter side of the pipe and the internal diameter side of the electrofusion socket are simultaneously melted.

Such an electrofusion method is easy to perform and provides excellent fusion quality, and thus the electrofusion method is mainly used for a pipe such as a gas pipe where air-tightness is required. However, since the manufacturing process of an electrofusion socket is complex, the price of an electrofusion socket is high, and thus an electrofusion socket is not commonly used as a general piping material for civil-engineering/construction work.

In addition, since a metal heating coil has a low resistance and thus requires a high supply current, a heavy power supply is necessary. For example, when an electric resistance of a heating coil is 1Ω and an electric voltage of 40 V is applied, 1600 W of electric current is supplied. Therefore, as a voltage converter for supplying a low voltage and a thick power line for supplying a high current are required, a general electrofusion power supply weighs about 20 kg, portability thereof is extremely low.

In addition, when the temperature of a synthetic resin increases during the electrofusion work, the resin may gain flowability and thus heating coils arranged in a constant interval may be moved and adhere to each other. As a result, local heating may occur and the electrofusion quality may be decreased.

In addition, in conventional electrofusion coupling methods, the size of a coupling pipe was recognized by attaching a bar code to a coupling pipe or a comparable resistance terminal was inserted to an inside of a coupling pipe. These size recognition methods are additional factors which increase the product unit price. In addition, as the outdoor temperature is decreased, the energy required for coupling pipe electrofusion increases. Thus, supplied energy needs to be varied depending on the seasons. However, since conventional electrofusion coupling methods do not have a function of controlling supplied energy depending on the outdoor temperature, a constant current at which over electrofusion takes place to some extent is generally applied. Therefore, when the outdoor temperature is lower than zero degree Celsius, electrofusion may not be performed.

While a gas pipe which is generally used for electrofusion coupling is made of PE, a PP pipe is used for water supply and hot water supply. In comparison with a PE resin, a PP resin has a higher melting temperature (164° C. of PP resin vs. 135° C. of PE resin), a lower combustion temperature (about 300° C. vs. about 410° C.), and a low heat conductivity (0.15 W/mK vs. 0.4 W/mK). Therefore, when the same power (voltage) as that of the PE pipe is applied to the PP pipe, heat transport to the PP pipe is slower and thus a PP resin around a metal coil of a coupling pipe starts to be melt even before an outer diameter side of the PP pipe is melted. In other words, for connecting a PP pipe by a conventional electrofusion coupling method, a low power (low voltage) should be supplied for a long period of time and thereby time for electrofusion increases.

Patents PCT/KR2007/000540 and PCT/KR2009/003620 relate to a method of using a conductive polymer composite as a cylinder type heating element instead of a heating coil, which has been used in conventional electrofusion methods. A matrix polymer of a conductive polymer composite is usually the same as the material of a pipe which is to be fused.

However, in a case where a conductive polymer composite is used as a heating element, when a constant voltage is supplied for a predetermined time for each pipe size, the resistance of the heating element increases and a low power is supplied in the early stage of electrofusion. However, after the heating element has melted, the resistance is drastically decreased and thus a high power is applied. Then, the temperature of the heating element is drastically increased and thereby the heating element and the polymer around the heating element burn out, resulting in unstable fusion of the pipe and the coupling pipe. When the voltage is lowered to perform stable electrofusion, the time for electrofusion becomes longer.

DETAILED DESCRIPTION OF THE INVENTION

Technical Problem

The present invention provides an electric power control apparatus and a method of controlling electric power using the same which supplies an optimum electric power allowing for stable electrofusion in response to temperature-dependent variation of electric resistance of a synthetic resin pipe electrofusion coupling pipe which uses a conductive polymer composite as a heating element instead of a conventional heating coil.

Technical Solution

An embodiment of the present invention for solving the technical problems provides an electric power control apparatus of an electrofusion coupling pipe using a conductive polymer composite as a heating element, comprising: a resistance-detecting unit which detects a resistance variation of the conductive polymer composite based on variation of a voltage and a current when electric power is supplied to the electrofusion coupling pipe; and an electric power-controlling unit which controls electric power supplied to the electrofusion coupling pipe according to the resistance variation.

An embodiment of the present invention for solving the technical problems provides a method of controlling electric power supplied to an electrofusion coupling pipe using a conductive polymer composite as a heating element, comprising: supplying electric power to the electrofusion coupling pipe; detecting resistance variation of the conductive polymer composite based on variation of a current and a voltage when the electric power is supplied; and controlling electric power supplied to the electrofusion coupling pipe on the basis of the resistance variation.

Another embodiment of the present invention for solving the technical problems provides a method of controlling electric power, comprising: supplying a first electric power to an electrofusion coupling pipe using a conductive polymer composite as a heating element; recognizing a diameter of the electrofusion coupling pipe by using a slope of the variation of the resistance of the conductive polymer composite when the first electric power is supplied; supplying a second electric power corresponding to the recognized diameter of the electrofusion coupling pipe.

Another embodiment of the present invention for solving the technical problems provides an electric power control apparatus of an electrofusion coupling pipe using a conductive polymer composite as a heating element, comprising: a storing unit which stores information regarding at least two time intervals and information regarding a electric power which is supplied during each of the at least two time intervals; and an electric power controlling unit which controls electric power supplied to the electrofusion coupling pipe by providing different electric power in each time interval based on the information stored in the storing unit.

Another embodiment of the present invention for solving the technical problems provides a method of controlling electric power of an electrofusion coupling pipe using a conductive polymer composite as a heating element, the method comprising: recognizing information regarding at least two time intervals and information regarding a magnitude of electric power which is supplied during each of the at least two time intervals; and supplying different electric power to the electrofusion coupling pipe in each time interval based on the recognized information.

Advantageous Effects

According to the present invention, electric power may be stably supplied by controlling room temperature resistance and temperature-dependent resistance variation of a conductive polymer composite which is used to form a synthetic resin pipe electrofusion coupling pipe. In addition, a light-weight electric power supplying apparatus having excellent portability may be provided. Electric power supplied by an electric power supplying apparatus may be supplied over several stages to reduce time required for fusion.

In addition, an embodiment of the present invention allows for automatic recognition of a diameter of a coupling pipe by using the difference in resistance slope from room temperature resistance to a maximum resistance in resistance variation of a conductive polymer composite and automatic recognition of outdoor temperature by using the difference in time to reach a maximum resistance value or a predetermined resistance value in resistance variation of a conductive polymer composite.

In addition, an embodiment of the present invention allows for automatic recognition of a material of a pipe to be fused, by using information regarding a room temperature resistance value and a maximum resistance value of a conductive polymer composite.

MODE OF THE INVENTION

Hereinafter, referring to the figures, an electric power control apparatus of a synthetic resin pipe electrofusion coupling pipe using a conductive polymer composite as a heating element and a method of controlling electric power using the same according to the present invention are described in detail.

Figure 1:
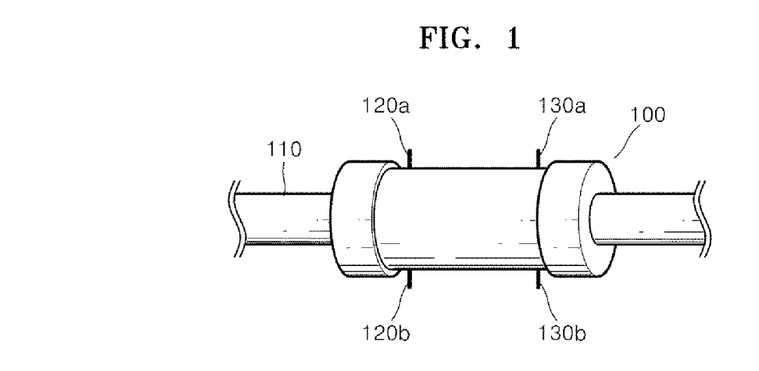
FIG. 1 is a diagram showing an example of a structure in which a pipe is connected with an electrofusion coupling pipe using a conductive polymer composite as a heating element to which the present invention is applied.
Figure 2:
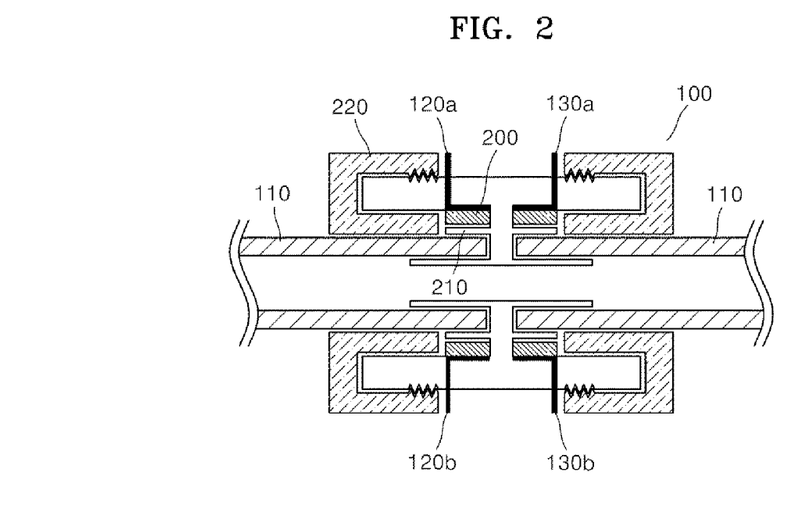
FIG. 2 is a diagram showing a cross-section of the synthetic resin pipe electrofusion coupling pipe of FIG. 1.

FIG. 1 is a diagram showing an example of a structure in which a pipe is connected with a synthetic resin pipe electrofusion coupling pipe using a conductive polymer composite as a heating element to which the present invention is applied, and FIG. 2 is a diagram showing a cross-section of the synthetic resin pipe electrofusion coupling pipe of FIG. 1.

As shown in FIGS. 1 and 2, the synthetic resin pipe electrofusion coupling pipe 100, which is interposed between two pipes 110, connects the two pipes 110. Two terminals of the coupling pipe 100 are fixed with threaded coupling parts 220. The coupling pipe 100 uses a conductive polymer composite 200 as a heating element. Electric connection terminals 120a, 120b, 130a, 103b for supplying electric power to the conductive polymer composite 200 protrude to outside of the coupling pipe 100. An electric power controlling apparatus according to the present invention supplies electric power to the conductive polymer composite 200 inside the coupling pipe 100 through the electric connection terminals 120a, 120b, 130a, 103b protruding to the outside. The temperature of the conductive polymer composite 200 increases by the supplied electric power, and an outer circumference surface of the pipe 110 and an inner circumference surface of the coupling pipe 210 are fused with each other by the temperature increase. A conductive polymer composite is prepared by adding conductive particles to a polymer resin so that electricity may be conducted among dispersed conductive particles within the polymer resin. For example, a conductive polymer composite may be prepared by mixing carbon black with high density polyethylene (HDPE). In addition, a pipe, a coupling pipe, and a matrix polymer of a conductive polymer may generally be made of a same material.

The synthetic resin pipe electrofusion coupling pipe illustrated in FIGS. 1 and 2 is only an example illustrating aspects of the present invention, and it is obvious that the electric power control apparatus and the method of controlling electric power according to the present invention may be applied to various structures of coupling pipes which use a conductive polymer composite. As another example, a coupling pipe which does not include an electric connection terminal 120a, 120b, 130a, and 103b shown in FIG. 1 and which may be fused by an induction heating method using high frequency may be applied to the present invention.

In addition, the term "coupling pipe" used herein refers to a coupling pipe which is connected with at least one pipe and is not limited to a coupling pipe which is used to connect the two pipes 110 shown in FIG. 1

Figure 3:
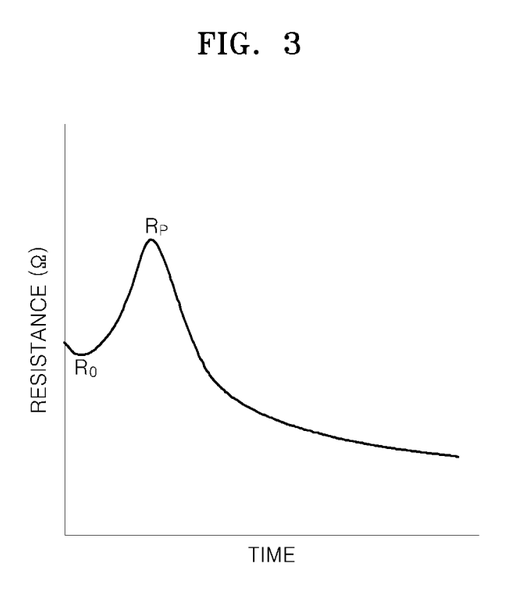
FIG. 3 is a diagram showing temperature-dependent resistance variation of a conductive polymer composite which is used as a heating element of an electrofusion coupling pipe according to the present invention.

FIG. 3 is a diagram showing temperature-dependent resistance variation of a conductive polymer composite which is used as a heating element of a synthetic resin pipe electrofusion coupling pipe according to the present invention.

As shown in FIG. 3, when a constant electric power is supplied to a conductive polymer composite prepared by mixing carbon black and HDPE, the conductive polymer composite is heated and the temperature of the conductive polymer composite increases. As the temperature of the conductive polymer heating element increases, a matrix polymer of the heating element expands, thereby separating interconnected conductive particles from each other or increasing the distance between the particles. As a result, electric current flow becomes difficult and resistance increases. When electric power is continuously supplied and thus, as the temperature increases, the resistance increases until the resistance reaches a maximum ($R_p$) at a limit point. The limit point is a melting point at which the heating element matrix polymer begins to be melt. When the temperature is further increased, resistance begins to decrease. This is because, when the heating element matrix polymer is in a liquid state and an electric field is applied to the heating element matrix polymer, conductive particles therein are connected with each other in a direction of the electric field. When electric power is further supplied and thus the temperature of the conductive polymer composite increases, the viscosity of the liquid state polymer is further decreased. As a result, movement of the conductive particles becomes easier, the more conductive particles are connected in the electric field direction and thereby the resistance is continuously decreased.

A polymer composite may be used as a temperature sensor by using the phenomenon that resistance of a polymer composite increases depending on the temperature. In other words, a polymer composite may be used to allow the flow of electric current at room temperature and stop the flow of electric current at a temperature higher than a predetermined temperature. For the above purpose, a polymer composite having a high ratio of maximum resistance ($R_p$) to room temperature resistance ($R_0$) may be advantageous.

However, to use a conductive polymer composite as a heating element of an electrofusion coupling pipe, an electric current should flow in the conductive polymer composite even at a temperature above the melting temperature of a matrix polymer. Therefore, the ratio of maximum resistance ($R_p$) to room temperature resistance ($R_0$) of a conductive polymer composite should be small. An $R_p/R_0$ ratio of a conductive polymer composite is determined by the kind and quantity of carbon black and the kind of a matrix polymer therein.

In addition, when a coupling pipe is designed and prepared so that a $R_0$ and $R_p$ or $R_p/R_0$ value is dependent on a matrix polymer used in the coupling pipe, an electric power supply may recognize the kind of a matrix polymer included in the coupling pipe. When a matrix polymer of a conductive polymer is formed of a material which is the same as that of a pipe to be fused, an electric power supply may automatically recognize the material of the pipe to be fused and adjust the magnitude of the electric power supplied to the pipe according to the material of the pipe.

The conductive polymer composite shown in FIG. 3 has an $R_p/R_0$ value about 2, and thus the conductive polymer composite is appropriate for use as a heating element for an electrofusion coupling pipe. In a case where electric power is continuously supplied, as the temperature of a resin in FIG. 1 increases, after the temperature of the resin reaches the melting point of the resin and the resin melts, the resistance first drastically decreases, and then gradually decreases. The resistance of the resin following the completion of electrofusion is lower than the initial room temperature resistance of the resin.

Room temperature resistance $R_0$ of a coupling pipe is dependent on a diameter of the coupling pipe and a volume specific resistance of a conductive polymer composite used as a heating element of the coupling pipe. When a room temperature resistance $R_0$ is 10Ω, the maximum resistance $R_p$ value is 20Ω. When 1000 W of electric power is supplied, the voltage is 100 V and the current is 10 A at room temperature. When the maximum resistance Rp is reached at the resin melting point, the voltage is 141 V and the current is 7.09 A. When 1600 W of electric power is supplied, the voltage is 126 V and the current is 12.70 A at room temperature. With the maximum resistance at the resin melting point, the voltage is 179 V and the current is 8.94 A.

When a room temperature resistance $R_0$ of a conductive polymer composite is 10Ω and an $R_p/R_0$ ratio is 2, the maximum electric power is about 2400 W. The voltage is 155 V and the current is 15.38 A at room temperature. With the maximum resistance at the resin melting point, the voltage is 219 V and the current is 10.96 A.

In conclusion, when a conductive polymer composite having a room temperature resistance $R_0$ of 10Ω and an $R_p/R_0$ ratio of 2 is used as a heating element for an electrofusion coupling pipe, a microprocessor may control electric power supply to provide a maximum power of 240 W using the general voltage of 220 V. Such a maximum controllable electric power is determined by a room temperature resistance $R_0$ and an $R_p/R_0$ ratio of a conductive polymer composite. In other words, when a room temperature $R_0$ and an $R_p/R_0$ ratio are decreased to lower values, the maximum supplied electric power increases. However, when a room temperature resistance $R_0$ is too small, too much great initial current may be generated. Therefore, a room temperature resistance $R_0$ needs to be adjusted to an appropriate value. When electric power is controlled by this method, neither a voltage converter nor a thick power line is required. As a result, an electric power supply may weigh as little as about 1 kg and an electric power supply may be portable.

In conventional electrofusion methods, a constant electric power (voltage) should be always supplied. However, when a conductive polymer composite is used as a heating element for a synthetic resin pipe electrofusion coupling pipe, electric power may be supplied in several stages.

As shown in FIG. 3, in a case where resistance of a heating element is dependent on time, in other words, in a case where the resistance varies according to the temperature, a large amount of electric power is supplied to the heating element for rapidly increasing of the temperature in an early stage. After melting of the heating element, a supplied electric power is equal to the amount of heat conduction to the area surrounding the heating element. Therefore, electrofusion may be stably performed in a state where the temperature around the heating element is no longer increased.

When electric power supply is controlled in this manner, not only may the quality of electrofusion be improved, but also, electrofusion time may be shortened. In particular, when the electric power supply method is applied to electrofusion of a polypropylene pipe to which electrofusion is difficult to perform due to the low combustion temperature of the polypropylene resin, electrofusion may be performed much more stably than conventional electrofusion methods.

Figure 4:
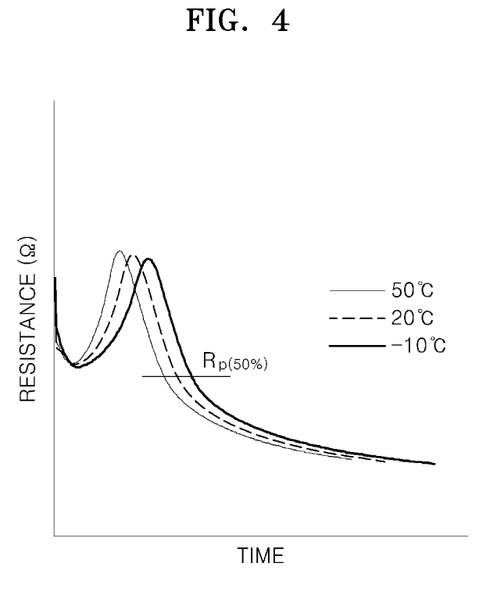
FIG. 4 is a diagram showing an example of resistance variation depending on an outdoor temperature in an electrofusion method using a conductive polymer composite as a heating element according to the present invention.

FIG. 4 is a diagram showing an example of outdoor temperature-dependent resistance variation of a conductive polymer composite which is used as a heating element in a synthetic resin pipe electrofusion method according to the present invention.

Although an outdoor temperature and a temperature of a coupling pipe are usually the same, an outdoor temperature and a temperature of a coupling pipe may be different in certain cases (e.g., when a coupling pipe has been stored for a long period of time in a closed space where the temperature is high or low, or when a coupling pipe has been exposed to direct sunlight for a long period of time). Therefore, an outdoor temperature of an example of the present invention is the same as a temperature of a coupling pipe.

As shown in FIG. 4, when an outdoor temperature is higher (e.g., 50° C.) than room temperature (20° C.), for example, during summer, the amount of time needed to change resistance of a conductive polymer composite from a room temperature resistance to a maximum resistance ($R_p$) becomes shorter. On the contrary, when an outdoor temperature is lower (e.g., −10° C.) than room temperature (20° C.), for example, during winter, the amount of time needed to change resistance of a conductive polymer composite from a room temperature resistance to a maximum resistance ($R_p$) becomes longer.

According to an example of the present invention, rather than measuring the time needed to change resistance of the conductive polymer composite from a room temperature resistance to a maximum resistance ($R_p$), the time needed for resistance of the conductive polymer composite to reach 50% of a maximum resistance ($R_{p(50\%)}$) at a point past a point of maximum resistance may be used as a reference for determining an outdoor temperature, because the time to reach $R_{p(50\%)}$ is greatly dependent on an outdoor temperature and thus an outdoor temperature may be more accurately determined.

As shown in the experimental example in FIG. 4, when the difference in time between a time point at which the resistance of a conductive polymer composite line is equal to room temperature resistance and a time point at which the resistance of a conductive polymer composite reaches a maximum resistance or another specific reference resistance is measured and stored in advance, after recognizing in real-time an outdoor temperature while supplying electric power by using an electric power control apparatus, an optimum electric power, that is, an electric power which is optimal for the recognized outdoor temperature, may be supplied.

An electric power control apparatus may not only supply an optimum electric power according to an outdoor temperature, but may also optimize electrofusion quality by varying electric power supplied at each time interval according to variation in resistance with respect to each time interval. For example, with reference to a maximum resistance ($R_p$) or a resistance point corresponding to 50% of a maximum resistance ($R_{p(50\%)}$), a large amount of electric power is supplied before the reference point and low amount of electric power is supplied after the reference point.

Figure 5:
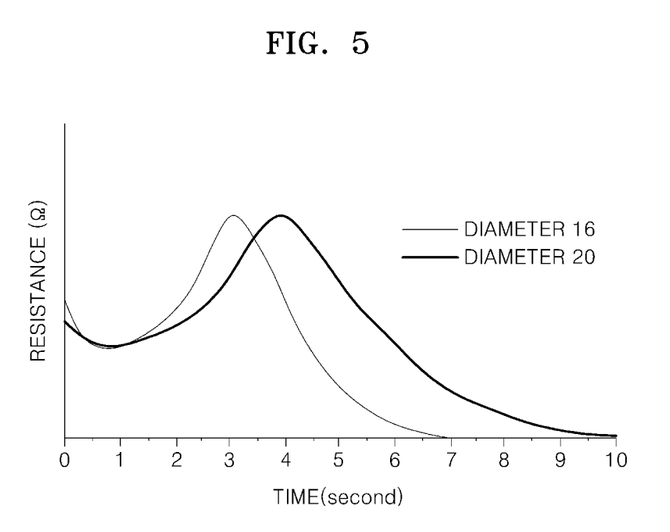
FIG. 5 is a diagram showing an example of resistance variation depending on a diameter of a coupling pipe in a synthetic resin pipe electrofusion method using a conductive polymer composite as a heating element according to the present invention.

FIG. 5 is a diagram showing an example of resistance variation in accordance with a diameter of a coupling pipe in a synthetic resin pipe electrofusion method using a conductive polymer composite as a heating element according to the present invention. FIG. 5 shows an experimental result of resistance variation when a diameter of a coupling pipe is 16 mm and 20 mm. The result indicates that, in an early time range from about 1 to 3 seconds, the slope of the resistance variation of the 16 mm coupling pipe was distinctively different than that of the 20 mm coupling pipe. Since the time required for reaching a maximum resistance from a room temperature resistance is dependent on a diameter of a coupling pipe, a diameter of a coupling pipe may be recognized based on the dependency. However, to recognize a diameter of a coupling pipe more quickly and to supply electric power according to the recognized diameter, a slope of resistance variation may be used.

A slope of resistance variation depending on a diameter of a coupling pipe is also dependent on electric power supplied to the coupling pipe. For example, as shown in FIG. 5, when a diameter of an HDPE coupling pipe is 16 mm and 20 mm and 250 W of initial electric power is supplied, a slope of resistance variation becomes 6.5 Ω/sec. As the supplied electric power increases, the slope is also increased.

Therefore, a range of resistance variation slope for each coupling pipe diameter with respect to an initial electric power may be stored in advance so that an electric power control apparatus may rapidly recognize a coupling pipe diameter based on a comparison of the stored slope and a measured slope of a coupling pipe and supply predetermined optimum electric power according to the recognized coupling pipe diameter.

Figure 6:
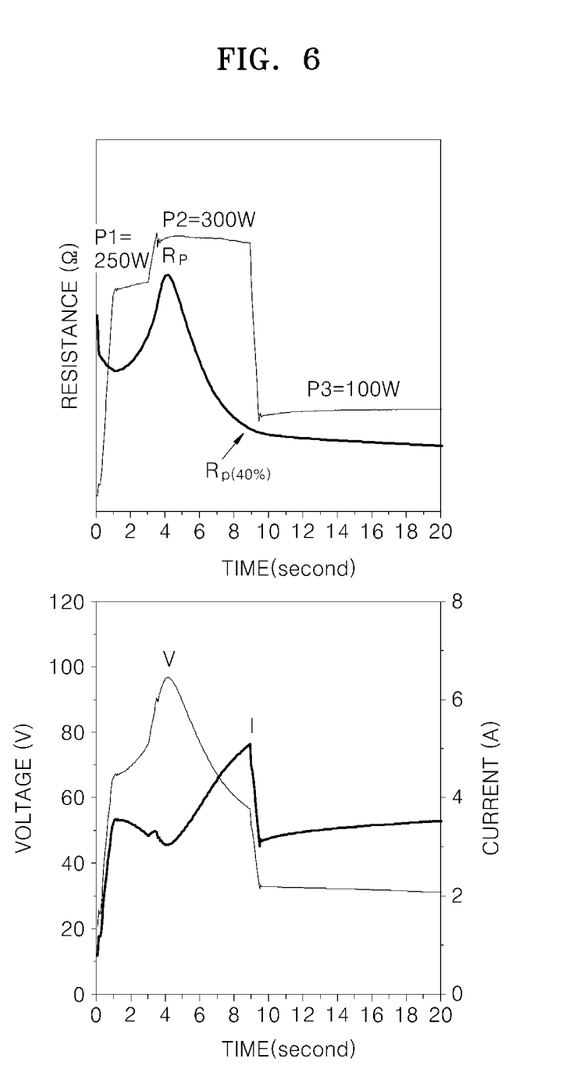
FIG. 6 is a diagram showing an example of electric power which is supplied during each time interval according to resistance variation in a synthetic resin pipe electrofusion method using a conductive polymer composite as a heating element according to the present invention.

FIG. 6 is a diagram showing an example of varying electric power supplied during each time interval according to resistance variation in an electrofusion method using a conductive polymer composite as a heating element according to the present invention.

The conductive polymer composite used in this experimental example employs, as a matrix polymer, HDPE, which is usually used for a synthetic resin pipe, and includes, as a filler, special carbon black, which is a conductive particle. In addition, the diameter of the coupling pipe is 20 mm.

As shown in FIG. 6, an electric power control apparatus initially supplies electric power of P1=250 W to the coupling pipe to measure the resistance variation slope thereof and thereby recognize the diameter of the coupling pipe. After recognizing the diameter of the coupling pipe on the basis of the resistance variation slope, the electric power control apparatus supplies electric power of P2=300 W to the coupling pipe. In addition, the electric power control apparatus uses information regarding the room temperature resistance and the maximum resistance of the coupling pipe to recognize the material of the coupling pipe.

Afterward, when the resistance of the conductive polymer composite of the coupling pipe reaches a resistance point past the point of maximum resistance $R_p$ which has been predetermined according to the recognized material of the coupling pipe, for example, a resistance point corresponding to 40% of a maximum resistance ($R_{p(40\%)}$), the electric power control apparatus reduces the supplied electric power to P3=100 W. The outdoor temperature is determined based on the measured time required for reaching the resistance point corresponding to 40% of a maximum resistance ($R_{p(40\%)}$). Then, amount of time that the supplied electric power is P3=100 W becomes longer in winter, while the amount of time that the supplied electric power is P3 becomes shorter in summer. The total amount of electric power supplied to the coupling pipe is determined by the P3 electric power supply time. Parameters for supplying an optimum amount of electric power in accordance with the coupling pipe diameter and the outdoor temperature are programmed in advance in the electric power control apparatus. The electric power control apparatus controls magnitude of either voltage or current to supply electric power of P1 to P3 described above. The bottom of FIG. 6 shows the time-dependent variation of voltage and current when electric power is supplied in stages including P1, P2, and P3 as described above.

Figure 7:
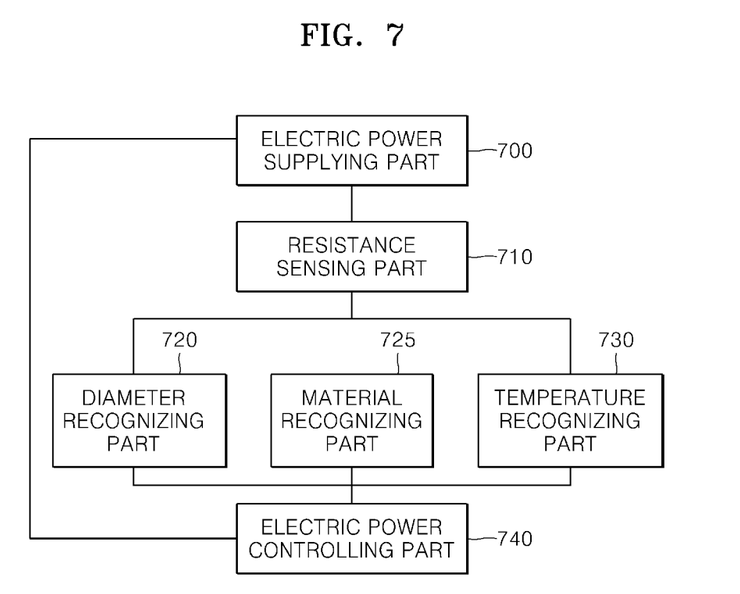
FIG. 7 is a diagram showing an example of an apparatus controlling electric power supplied to an electrofusion coupling pipe using a conductive polymer composite as a heating element according to the present invention.

FIG. 7 is a diagram showing an example of an apparatus controlling electric power supplied to an electrofusion coupling pipe using a conductive polymer composite as a heating element according to the present invention.

As shown in FIG. 7, the electric power control apparatus according to the present invention includes an electric power-supplying unit 700, a resistance-detecting unit 710, a diameter-recognizing unit 720, a material-recognizing unit 725, a temperature-recognizing unit 730, and electric power-controlling unit 740.

The electric power-supplying unit 700 supplies, according to the control of the electric power-controlling unit 740, electric power to an electrofusion coupling pipe using a conductive polymer composite as a heating element. The electric power-supplying unit 700, according to the control of the electric power-controlling unit 740, varies voltage or current to supply a specific electric power. When an electrofusion coupling pipe is a coupling pipe based on high frequency induction heating fusion, the electric power-supplying unit 700 may vary a frequency to vary the magnitude of supplied electric power.

The resistance-detecting unit 710 recognizes the magnitude of voltage and current when the electric power-supplying unit supplies electric power to an electrofusion coupling pipe to detect a resistance of a conductive polymer composite. When electric power is supplied to a conductive polymer composite, the magnitude of the resistance varies as shown in FIG. 3. Therefore, the resistance-detecting unit 710 may detect the resistance variation of a conductive polymer composite on the basis of the variation of the voltage and current when the electric power-supplying unit 700 supplies a certain magnitude of electric power (e.g., 250 W).

The pattern of the resistance variation detected by the resistance-detection unit 710 is changed according to the diameter or material of an electrofusion coupling pipe or an outdoor temperature. For example, as shown in FIGS. 4 and 5, the time for the resistance of a conductive polymer composite to reach a maximum resistance is dependent on an outdoor temperature (as shown in FIG. 4.) and a diameter of a coupling pipe (as shown in FIG. 5), and the slope of the resistance variation is also dependent on an outdoor temperature and a diameter of a coupling pipe.

The diameter-recognizing unit 720 stores information regarding the resistance variation (slope of the resistance variation or time required to reach a maximum resistance, etc.) of a conductive polymer composite when a certain electric power is supplied for each diameter of coupling pipes (e.g., 16 mm, 20 mm, etc.), in advance. During an electrofusion work of providing electric power, the diameter-recognizing unit 720 compares the real-time resistance variation of a conductive polymer composite with the stored resistance variation to recognize a diameter of the coupling pipe.

The material-recognizing unit 725 recognizes a material by using a room temperature resistance $R_0$ and a maximum resistance $R_p$ or a ratio of two resistance ($R_p/R_0$) recognized by the resistance-sensing unit 710. For this, the material-recognizing unit 725 stores the $R_0$ and $R_p$ or the $R_p/R_0$ ratio of each material in advance and compares the resistance recognized by the resistance-detecting unit 710 with the resistance of each material stored in advance to recognize a material of the electrofusion coupling pipe.

For example, in a case where the $R_p/R_0$ ratio of polyethylene is 1.6 and the $R_p/R_0$ ratio of polypropylene is 1.4, the material-recognizing unit 725 recognizes a material of a coupling pipe as polyethylene when the $R_p/R_0$ ratio recognized by the resistance-detecting unit 710 is 1.6 and as polypropylene when the $R_p/R_0$ ratio recognized by the resistance-detecting unit 710 is 1.4. The information regarding each material may be stored in advance in the apparatus according to the present invention or entered into the apparatus through an input apparatus. As another example, the apparatus according to the present invention may include an interface through which a separate memory device (e.g., USB memory, etc.) in which information regarding resistance of each material which is stored may be inserted.

The temperature-recognizing unit 730 stores information regarding the resistance variation (slope of the resistance variation or time required to reach a maximum resistance, etc.) of a conductive polymer composite at a temperature higher or lower than room temperature in advance. During an electrofusion work or providing electric power, the temperature-recognizing unit 730 compares the real-time resistance variation of a conductive polymer composite with the stored resistance variation to recognize the outdoor temperature.

It is obvious that the diameter-recognizing unit 720, the material-recognizing unit 725, and the temperature-recognizing unit 730 may use another variable for distinguishing the difference of the resistance variation shown in FIGS. 4 and 5 in addition to the slope of the resistance variation or the time required to reach a maximum resistance.

The electric power-controlling unit 740 controls electric power supplied by the electric power-supplying unit 700 according to the resistance variation detected by the resistance-detecting unit 710. To increase the electrofusion quality of a coupling pipe, it is appropriate to initially supply a large amount of electric power to rapidly increase the temperature of a conductive polymer composite. After the conductive polymer composite reaches a maximum resistance, which is achieved at a melting point of a matrix polymer where the matrix polymer begins to melt, a low electric power is then supplied to stably perform electrofusion because, from a certain time point after the matrix polymer has begun to melt, the needed electric power is equal to the amount of heat conduction to the area surrounding the heating element. Therefore, the electric power-controlling unit 740 varies the magnitude of supplied electric power with reference to a maximum resistance of the conductive polymer composite, which is achieved at the point where the matrix polymer begins to melt, or with reference to a point where the resistance of the conductive polymer composite is decreased to a certain ratio past a maximum resistance (e.g., a resistance point corresponding to 50% of a maximum resistance).

In addition, the electric power-controlling unit 740 controls electric power to supply low electric power in an early stage of electric power supply so that the diameter-recognizing unit 720 may recognize a diameter of a coupling pipe. After the diameter-recognizing unit 720 recognizes the diameter of a coupling pipe, the electric power-controlling unit 740 searches for the optimum electric power for coupling pipe diameter which is stored in advance and controls the electric power-supplying unit 700 to supply the optimum electric power.

In addition, after the material-recognizing unit 725 recognizes a material of a coupling pipe, the electric power-controlling unit 740 searches for the optimum electric power for coupling pipe material which is stored in advance and controls the electric power-supplying unit 700 to supply the optimum electric power.

In addition, after the temperature-recognizing unit 730 recognizes an outdoor temperature, the electric power-controlling part 740 searches for the optimum electric power for outdoor temperature which is stored in advance and controls the electric power-supplying unit 700 to supply the optimum electric power.

In this manner, the electric power-controlling unit 740 not only controls the electric power-controlling unit 740 to supply the optimum electric power according to the diameter and material of a coupling pipe and an outdoor temperature but also supplies the optimum electric power for each time interval divided with reference to the resistance variation so that electrofusion may performed stably.

Figure 8:
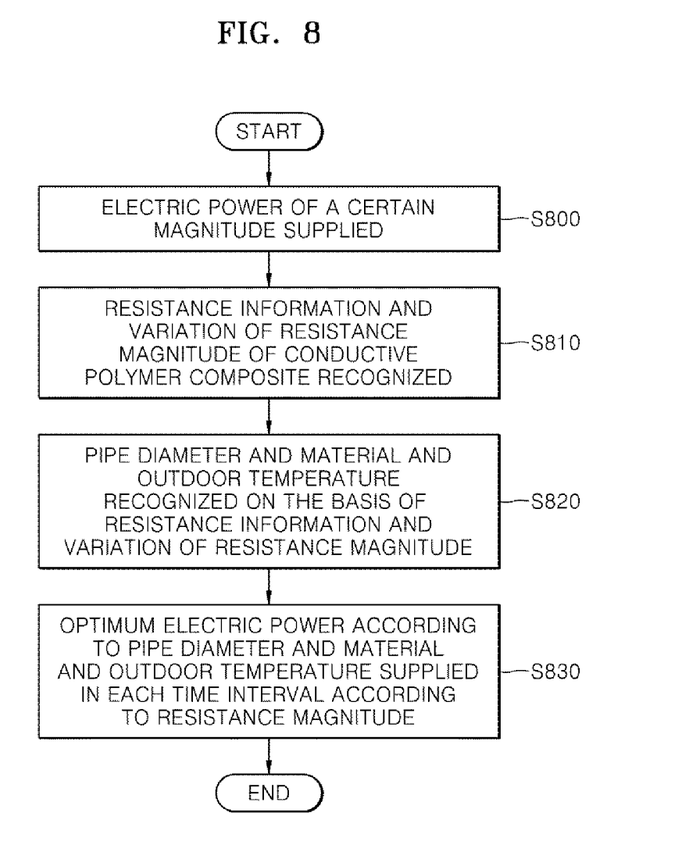
FIG. 8 is a diagram showing an example of a method of controlling electric power supplied to an electrofusion coupling pipe using a conductive polymer composite as a heating element according to the present invention.

FIG. 8 is a diagram showing an example of a method of controlling electric power supplied to an electrofusion coupling pipe using a conductive polymer composite as a heating element according to the present invention.

As shown in FIG. 8, the electric power control apparatus supplies a low electric power in the early stage to an electrofusion coupling pipe (S800). On the basis of the variation of the voltage and current during the electric power supply, the electric power control apparatus recognizes the resistance variation of a conductive polymer composite depending on temperature (S810). On the basis of the resistance variation of the conductive polymer composite, the electric power control apparatus recognizes the diameter and material of a coupling pipe and an outdoor temperature (S820) and supplies the optimum electric power according to the recognized information in each time interval which is divided with reference to the resistance magnitude (S830). For example, as shown in FIG. 6, a room temperature resistance and a resistance slope of a conductive polymer composite are recognized by supplying 250 W of electric power in the early stage and the recognized information is used to recognize the material and diameter of a coupling pipe. Then, 300 W of electric power, which is the optimum electric power according to the diameter, is supplied. Subsequently, the electric power control apparatus recognizes an outdoor temperature on the basis of the time required to reach a maximum resistance of the conductive polymer composite and then supplies 100 W of electric power which is the optimum electric power from a resistance point corresponding to 40% of a maximum resistance. The value 40% herein is a predetermined data corresponding to the recognized material, and 50% may be applied to another material.

Figure 9:
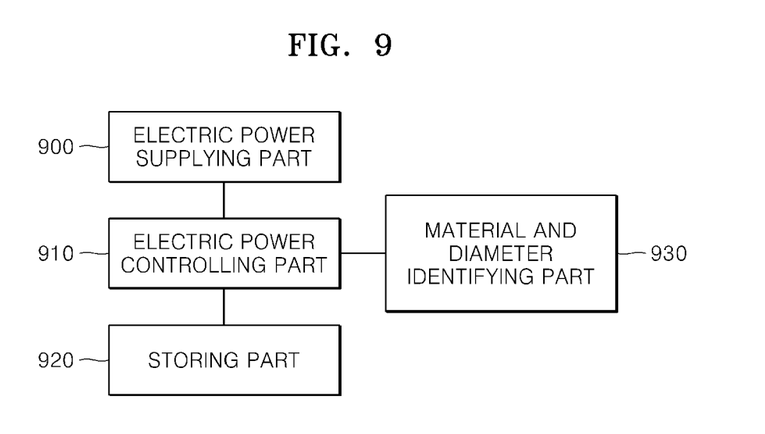
FIG. 9 is a diagram showing another example of an apparatus controlling electric power supplied to an electrofusion coupling pipe using a conductive polymer composite as a heating element according to the present invention.

FIG. 9 is a diagram showing another example of an apparatus controlling electric power supplied to an electrofusion coupling pipe using a conductive polymer composite as a heating element according to the present invention.

As shown in FIG. 9, the electric power control apparatus according to the present invention includes an electric power-supplying unit 900, an electric power-controlling unit 910, a storing unit 920, and a material and diameter-identifying unit 930.

The electric power-supplying unit 900 supplies, according to the control of the electric power-controlling unit 910, electric power to an electrofusion coupling pipe using a conductive polymer composite as a heating element. The electric power-supplying unit 900 varies the voltage, current or frequency to supply a certain amount of electric power to an electrofusion coupling pipe.

The storing unit 920 stores information regarding at least two time intervals and information regarding the magnitude of electric power supplied in each time interval. The storing unit 920 may store various information regarding the time interval and the magnitude of supplied electric power according to each material and/or diameter of an electrofusion coupling pipe.

The material and diameter-identifying unit 930 identifies the material and diameter of an electrofusion coupling pipe. The material and diameter-identifying unit 930 may identify a diameter of an electrofusion coupling pipe by various methods such as using a resistance for material and diameter identification, which is installed on an electrofusion coupling pipe, reading with a reader a bar code or RFID attached to an electrofusion coupling pipe, and allowing a user to directly input the material and diameter information.

The electric power-controlling unit 910 controls the electric power-supplying unit 900 on the basis of the information regarding the time interval and the magnitude of electric power supplied in each time interval, which is stored in the storing unit 920, to supply different electric power in each time interval to an electrofusion coupling pipe. The storing unit 920 stores information regarding different time intervals and different electric power for each diameter of a coupling pipe. When a diameter of a coupling pipe has been identified by the material and diameter-identifying unit 930, the electric power-controlling unit 910 recognizes the information regarding the time interval and the magnitude of electric power for the material and diameter of the coupling pipe and controls the electric power-supplying unit 900 on the basis of the recognized information so that different electric power may be supplied in each time interval to the electrofusion coupling pipe.

Figure 10:
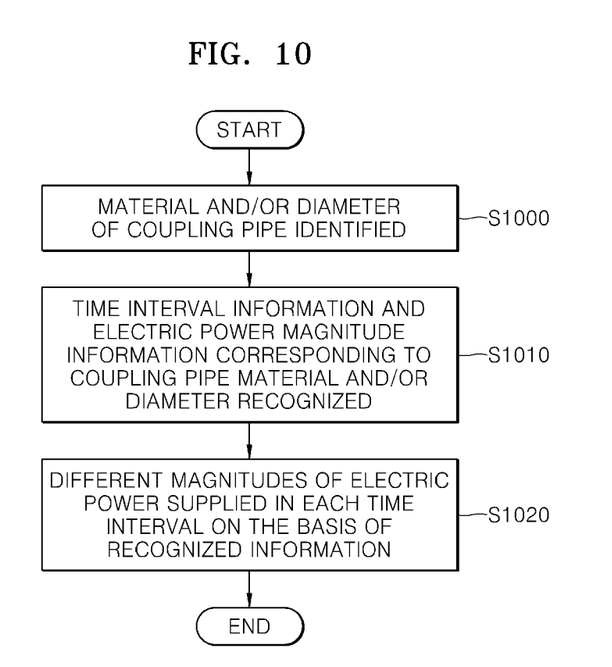
FIG. 10 is a diagram showing another example of a method of controlling electric power supplied to an electrofusion coupling pipe using a conductive polymer composite as a heating element according to the present invention.

FIG. 10 is a diagram showing another example of a method of controlling electric power supplied to an electrofusion coupling pipe using a conductive polymer composite as a heating element according to the present invention.

As shown in FIG. 10, the electric power control apparatus firstly identifies a material and/or a diameter of an electrofusion coupling pipe (S1000). Identifying a material and a diameter may be performed by various methods as shown in FIG. 9. After a material and/or a diameter of an electrofusion coupling pipe are identified, the electric power control apparatus recognizes information regarding time interval and electric power for each material and/or diameter (S1010). For example, the electric power control apparatus may recognize the information regarding time interval and magnitude of electric power for each material and/or diameter stored in a storage of the electric power control apparatus or receives from a user the information regarding time interval and magnitude of electric power and stores the received information. The electric power control apparatus supplies different electric power to each time interval on the basis of the recognized information (S1020).

The present invention may be implemented as computer-readable code on a computer-readable recording medium. The computer-readable recording medium includes all types of storage devices in which computer system-readable data is stored. Examples of the computer-readable recording medium include Read Only Memory (ROM), Random Access Memory (RAM), Compact Disk-Read Only Memory (CD-ROM), magnetic tape, a floppy disk, and an optical data storage device. Moreover, the computer-readable medium may be distributed across computer systems connected via a network, so that computer-readable code can be stored and executed in a distributed manner.

While the present invention has been particularly shown and described with reference to exemplary embodiments thereof, it will be understood by one of ordinary skill in the art that various changes in form and details may be made therein without departing from the spirit and scope of the present invention as defined by the following claims. Therefore, the preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. An electric power control apparatus of an electrofusion coupling pipe using a conductive polymer composite as a heating element, comprising:
    a resistance-detecting unit configured to detect a resistance variation of the conductive polymer composite based on variation of a voltage and a current when electric power is supplied to the electrofusion coupling pipe; and
    an electric power-controlling unit configured to control electric power supplied to the electrofusion coupling pipe according to the resistance variation;
    wherein the electric power-controlling unit is configured to divide a time interval when electric power is supplied to the electrofusion coupling pipe into at least two time intervals with reference to the resistance variation of the conductive polymer composite which is recognized by the resistance-detecting unit and then supplies different predetermined electric power in each time interval.

2. The electric power control apparatus of claim 1, wherein the electric power control apparatus further comprises a diameter-recognizing unit which recognizes a diameter of the electrofusion coupling pipe by using difference in resistance variation of the conductive polymer composite according to a diameter of the electrofusion coupling pipe and the electric power-controlling unit controls supplied electric power according to the diameter of the electrofusion coupling pipe recognized by the diameter-recognizing unit.

3. The electric power control apparatus of claim 1, wherein the electric power control apparatus further comprises a material-recognizing unit which recognizes a material of the electrofusion coupling pipe by using difference in a resistance value or resistance variation of the conductive polymer composite according to a material of the electrofusion coupling pipe and the electric power-controlling unit controls supplied electric power according to the material of the electrofusion coupling pipe recognized by the material-recognizing unit.

4. The electric power control apparatus of claim 1, wherein the electric power control apparatus further comprises a temperature-recognizing unit which recognizes an outdoor temperature of the electrofusion coupling pipe by using difference in resistance variation of the conductive polymer composite according to an outdoor temperature of the electrofusion coupling pipe and the electric power-controlling unit controls supplied electric power according to the outdoor temperature of the electrofusion coupling pipe recognized by the temperature-recognizing unit.

5. The electric power control apparatus of claim 1, wherein the electric power-controlling unit varies current, voltage, or frequency to control supplied electric power.

6. A method of controlling electric power supplied to an electrofusion coupling pipe using a conductive polymer composite as a heating element, comprising:
    supplying electric power to the electrofusion coupling pipe;
    detecting resistance variation of the conductive polymer composite based on variation of a current and a voltage when the electric power is supplied; and
    controlling electric power supplied to the electrofusion coupling pipe on the basis of the resistance variation;
    wherein the method of controlling electric power comprises dividing a time interval when electric power is supplied to the electrofusion coupling pipe into at least two time intervals with reference to the resistance variation of the conductive polymer composite, and supplying different predetermined electric power in each time interval.

7. The method of controlling electric power of claim 6, wherein the method of controlling electric power further comprises recognizing a diameter of the electrofusion coupling pipe by using difference in resistance variation of the conductive polymer composite according to a diameter of the electrofusion coupling pipe; and the controlling of electric power comprises controlling electric power on the basis of the diameter of the electrofusion coupling pipe.

8. The method of controlling electric power of claim 6, wherein the method of controlling electric power further comprises recognizing a material of the electrofusion coupling pipe by using a resistance value or resistance variation of the conductive polymer composite according to a material of the electrofusion coupling pipe; and the controlling of electric power comprises controlling electric power on the basis of the material of the electrofusion coupling pipe.

9. The method of controlling electric power of claim 6, wherein the method of controlling electric power further comprises recognizing an outdoor temperature by using difference in resistance variation of the conductive polymer composite according to an outdoor temperature of the electrofusion coupling pipe; and the controlling of electric power comprises controlling electric power on the basis of the outdoor temperature.

10. A method of controlling electric power, comprising:
supplying a first electric power to an electrofusion coupling pipe using a conductive polymer composite as a heating element;
recognizing a diameter of the electrofusion coupling pipe by using a slope of a variation in the resistance of the conductive polymer composite when the first electric power is supplied;
supplying a second electric power corresponding to the recognized diameter of the electrofusion coupling pipe;
recognizing a material of the electrofusion coupling pipe by using information regarding a room temperature resistance value and a maximum resistance value of the conductive polymer composite;
recognizing an outdoor temperature by using difference in time to reach the maximum resistance value of the conductive polymer composite or to reach a resistance value point which is predetermined according to the recognized material past the maximum resistance value point; and
supplying a third electric power corresponding to the material and the outdoor temperature.

11. An electric power control apparatus of an electrofusion coupling pipe using a conductive polymer composite as a heating element, comprising:

a storing unit configured to store information regarding at least two time intervals and information regarding a electric power which is supplied during each of the at least two time intervals; and an electric power controlling unit configured to control electric power supplied to the electrofusion coupling pipe by providing different electric power in each time interval based on the information stored in the storing unit;

wherein the storing unit is configured to store information regarding a time interval for each material and diameter of an electrofusion coupling pipe and information regarding a magnitude of electric power which is supplied in each time interval; and the electric power controlling unit is configured to recognize from the storing unit information regarding a time interval corresponding to a material and diameter of the electrofusion coupling pipe and information regarding a magnitude of electric power which is supplied in the time interval and then supplies different electric power to the electrofusion coupling pipe in each time interval based on the recognized information.

12. A method of controlling electric power of an electrofusion coupling pipe using a conductive polymer composite as a heating element, the method comprising:

recognizing information regarding at least two time intervals and information regarding a magnitude of electric power which is supplied during each of the at least two time intervals; and supplying different electric power to the electrofusion coupling pipe in each time interval based on the recognized information;

wherein the recognizing comprises identifying a material and diameter of the electrofusion coupling pipe; and recognizing information regading a time interval corresponding to the material and diameter of the electrofusion coupling pipe and information regarding the magnitude of electric power supplied in each time interval.

\* \* \* \* \*